Oct. 9, 1956     G. A. CHAUSTOWICH     2,766,367
HEATING ELEMENT
Filed May 2, 1955     2 Sheets-Sheet 1
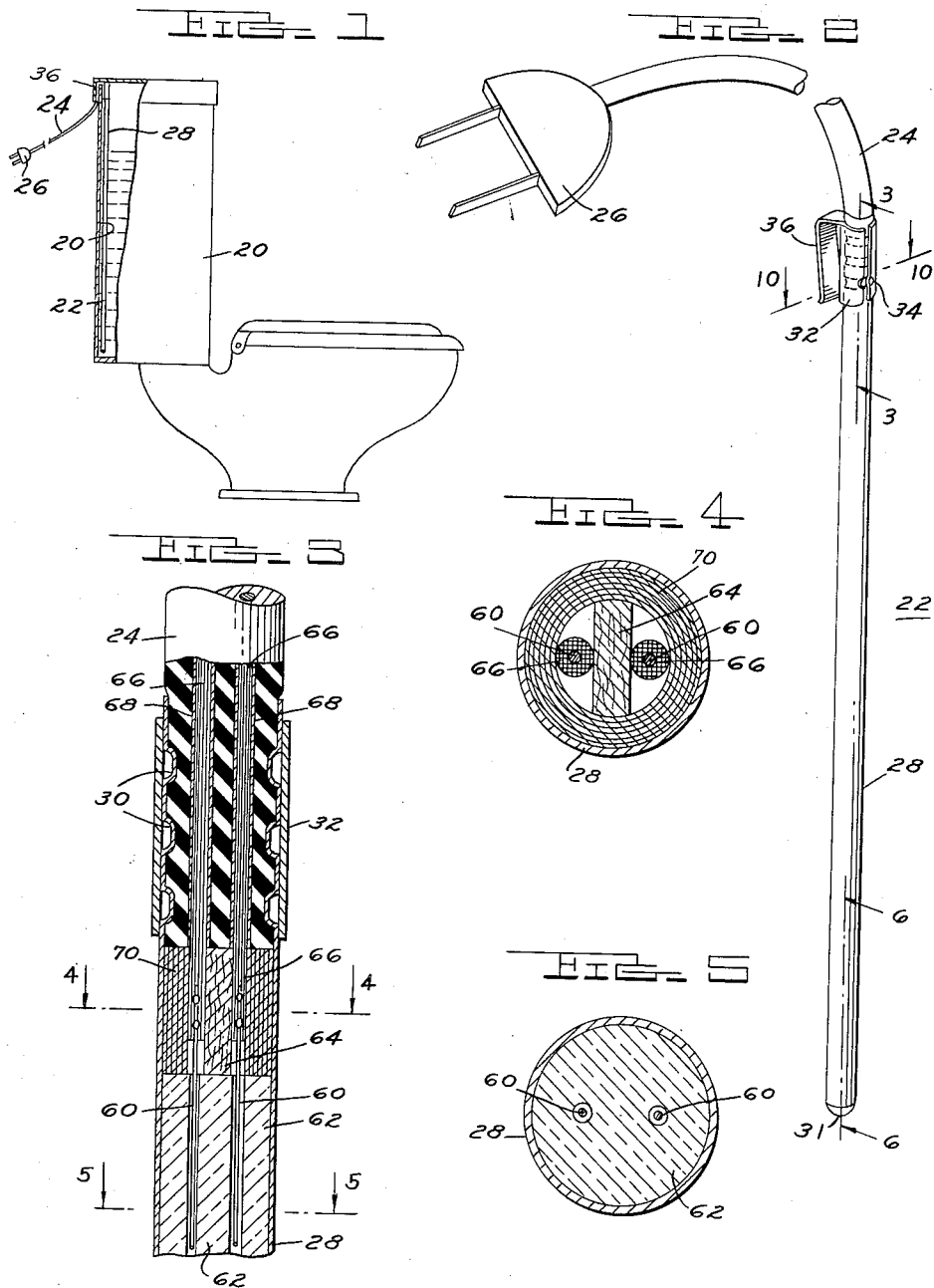
INVENTOR.
GABRIEL A. CHAUSTOWICH
BY
Burton & Parker
ATTORNEYS

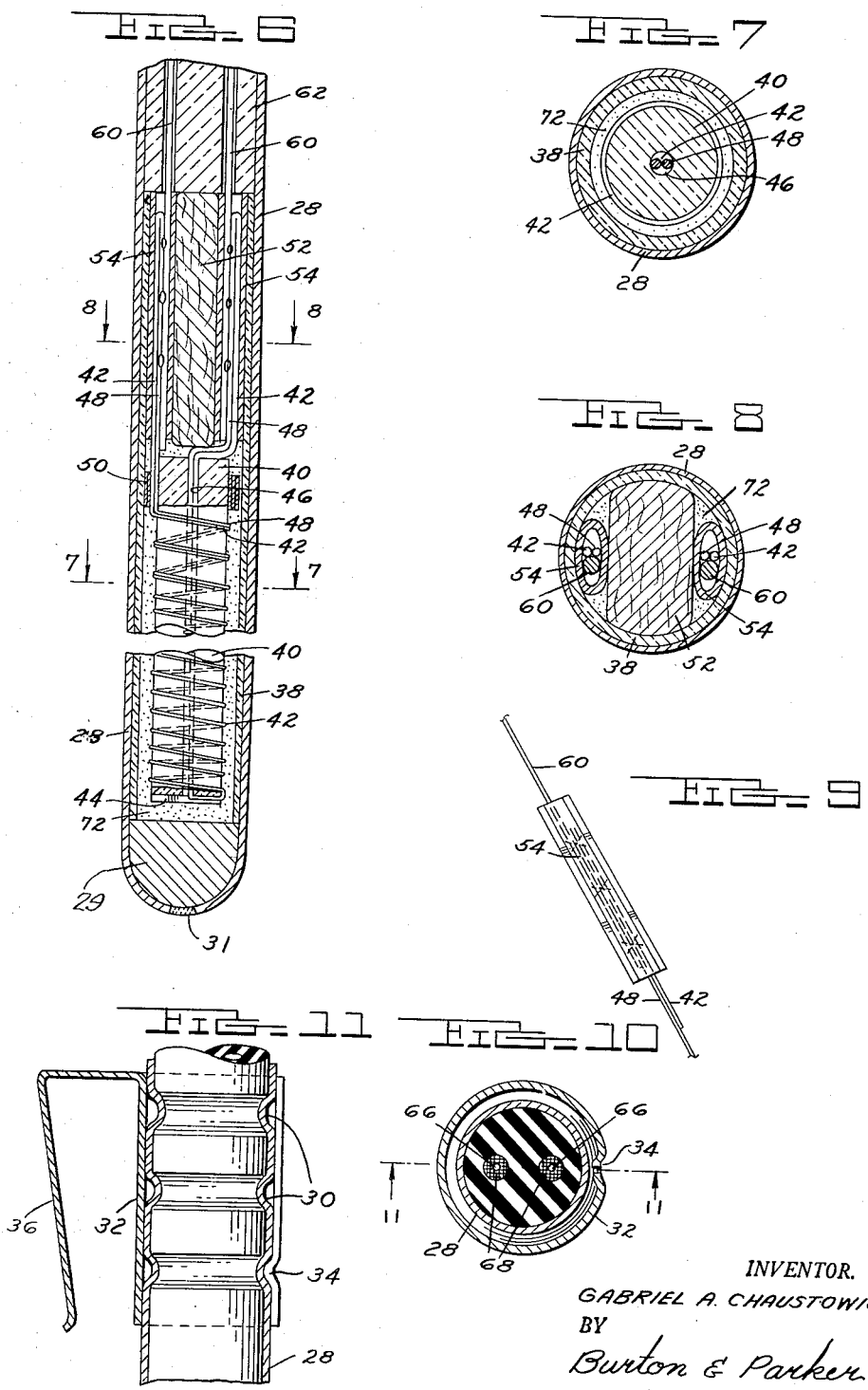

United States Patent Office 2,766,367
Patented Oct. 9, 1956

2,766,367
HEATING ELEMENT

Gabriel A. Chaustowich, Highland Park, Mich., assignor, by direct and mesne assignments, to Dripban Corporation, Detroit, Mich., a corporation of Michigan Application May 2, 1955, Serial No. 505,487

3 Claims. (Cl. 219—41)

This invention relates to an electric heating element.

An object is to provide an electric heating element particularly designed for use to heat the water in a toilet tank from a low temperature to a temperature which will inhibit condensation on the outer surface of the tank.

One of the known disadvantages of a household plumbing system where the water is supplied from an outdoor well at a low temperature is that the toilet tank is subject to condensation forming thereon in warm summer weather. Apparatus in the form of drip pans has been provided which is secured below the toilet tanks to collect such condensation and these pans are either drained to a suitable outlet or sponges are provided with which the water collecting therein can be picked up. Such practices are conventional but inconvenient and unsightly.

An object of my invention is to provide a suitable heating element which can be disposed within the toilet tank and which will maintain the water in the tank at such a temperature that condensation will not collect upon the outer surface of the tank. The water which is brought into the tank from the well at a temperature of, for example, 50° F., will be brought up to room temperature or thereabouts very quickly and will be kept at such temperature and this will prevent the collection of droplets of water on the outer surface of the tank.

An important feature is that the heating element is simple, inexpensive, and easily adapted for attachment to a tank or removal therefrom as the same may be desired for use.

Another important feature is that my improved heating element is so designed that it is hermetically sealed against the entrance of water thereinto and it is safe and economical in use.

More particularly an object is the provision of such a heating element which will function to heat the water in the lower third portion of the tank and such water will circulate and maintain a generally even temperature throughout the tank and the capacity of the heating element is such that it will not bring the water to a temperature which will cause evaporation or loss thereof but will normally maintain the average quantity of water in the tank at the desired temperature.

Another object is the provision of a heating element which has been particularly designed and constructed so that the heating wires themselves are completely protected and electrically insulated within the element and are so disposed and arranged that the lower portion of the element which will be positioned adjacent to the bottom of the tank is brought to a relatively high temperature, and the upper portion of the element which is disposed adjacent to the top of the tank within the water therein is brought to a relatively lower temperature.

The heating element is so constructed that the interior heating wires themselves are fully and completely insulated against any bridging thereacross and the heating wires are also hermetically sealed within the interior of the element.

Other objects, advantages and meritorious features of the construction will more fully appear from the following description, claims, and accompanying drawings wherein:

Fig. 1 is an elevation partly broken away of the toilet tank provided with my improved heating element;

Fig. 2 is an elevation partly broken away of the heating element itself;

Fig. 3 is a vertical sectional view taken on line 3—3 of Fig. 2;

Fig. 4 is a horizontal sectional view taken on line 4—4 of Fig. 3;

Fig. 5 is a horizontal sectional view taken on line 5—5 of Fig. 3;

Fig. 6 is a vertical sectional view taken on line 6—6 of Fig. 2;

Fig. 7 is a horizontal sectional view taken on line 7—7 of Fig. 6;

Fig. 8 is a horizontal sectional view taken on line 8—8 of Fig. 6;

Fig. 9 is a fragmentary elevation of a portion of one of the heating wires;

Fig. 10 is a horizontal sectional view taken on line 10—10 of Fig. 2; and

Fig. 11 is a vertical sectional view taken on line 11—11 of Fig. 10.

In the drawings a toilet tank is indicated by the numeral 20. Such tank is of any conventional construction. Such a tank as normally provided for household use ordinarily holds 3 to 4 gallons of water or thereabouts. When such equipment is used in the country in connection with water supplied from a well, such water supply is frequently at a low temperature of approximately 50° F. In the summer, under certain conditions, condensation forms on the outer wall of the tank and drops down on the floor with resulting damage to the floor and the floor covering. Such condensation is due to the low temperature of the water within the interior of the tank as compared with the temperature of the atmosphere in the room and the moisture therein. My invention is the provision of an improved heating element which may be readily attached to the tank so that the element itself is suspended within the interior of the tank and is designed to be coupled with an electric outlet. The element heats the water in the tank and it is so constructed that it will bring the water within the tank within the temperature of 80° F. or thereabouts in an hour or less. Due to the quantity of water in the tank, water will not be heated to a point of vaporization and it will be normally maintained at approximately room temperture.

The element itself comprises a tubular assembly indicated generally in the drawings as 22, having connected therewith an electric cord 24 which terminates in an electric connection 26 adapted to be connected as desired with a suitable wall outlet.

The heating element assembly 22 consists of a metal tube 28 which may be formed of steel or other suitable heat-conducting, water-resisting metal. This tube 28 is fitted interiorly with a metal plug 29 and the end wall of the tube is formed thereabout as shown in Fig. 6 and the opening 31 which results from its formation is filled with suitable brazing metal which is brazed to the plug 29 so that the end of the tube is hermetically sealed. Within this tube the electric heating wires themselves are disposed as hereinafter described.

The upper end of the tube is received over the end of the electric cord 24 and is securely fastened to the exterior of the cord as by clamping the metal tube as at 30 around and into the rubber covering of the cord in such a manner as to provide a hermetically sealed connection between the cord and the tube, all as shown in Fig. 3. To suspend the heating element within the interior of a toilet tank as shown in Fig. 1, there is provided a metal clip which has a tubular portion 32 that is adapted to grippingly embrace the upper end of the tube as shown in Figs. 2 and 3. Such gripping tubular portion may be provided with an indentation 34 adapted to be received within any one of the corrugations 30 about the upper end of the tube as shown in Figs. 2 and 11, to securely support the tube and for adjustment of the clip lengthwise of the tube from one corrugation to another. This clip has a hanger portion 36 which is removably receivable over the upper margin of the wall of the water tank as shown in Fig. 1 so that the tube is suspended therein with the lower end of the tube disposed closely adjacent to but normally spaced from the bottom wall of the tank as shown in Fig. 1.

Within the lower end of the metal tube there is disposed a ceramic shell or tube 38 which seats at its lower end upon the plug 29. Within this ceramic tube is disposed a ceramic core 40. A fine electric wire 42 is wound about the surface of this cylindrical core 40 in a succession of closely spaced spirals as shown in exaggerated form in Fig. 6. Actually these spirals are closely wound about the core so as to provide a sufficient number of windings within the limited space but in such a manner as to insulate the successive spirals and prevent bridging thereof. The lower end of the core is provided with a diametrical kerf 44 shown in Fig. 6 and the fine metal electric winding wire, which may be chrome nickel wire, is led through such kerf and up through an axial passageway 46 formed in the core as shown in Figs. 6 and 7. It has been found that for an installation of the character herein described, a chrome nickel wire of .008" is normally satisfactory for a 100-watt system. Obviously this might be varied, depending upon the voltage employed.

In order to reduce the temperature of the element at a point approximating the upper end portion of the core, it will be noted that the winding wire 42 is overlapped throughout its upper end portion with a second winding wire 48. This overlapping lead 48 overlaps the lead wire 42 not only throughout the uppermost spirals of the wire 42 which encircle the core, but also throughout the upper end of the lead of the wire 42 which extends axially through the core as shown in Figs. 6 and 7. It will also be noted that throughout this overlapping lead wire portion of the core the encircling spirals are spaced further apart than at the lower end of the core. The view in Fig. 6 is exaggerated in that the coils would be spaced closer together than there shown. The spacing of the coils at the lower end would be approximately the diameter of the wire lead itself.

In the fabrication of the structure, when the insulating core 40 has been wound with the fine wire properly spaced, it is dipped into a quick-setting liquid electric cement which fixes it permanently in position and prevents shifting of the spirals upon the core. To further hold the winding in place, suitable insulating adhesive tape, such as adhesive glass cloth tape 50, is wound about the upper end of the core and about the winding lead thereover, securely fastening the same in position.

The overlapped wires 42 and 48 are extended up on opposite sides of a ceramic spacer block 52 and inserted within connector tubes formed of suitable conductive metal and indicated in Figs. 8 and 9 as 54. Into the opposite ends of these tubes 54 are inserted electric lead wires 60 of larger diameter and connection is made between these lead wires 60 and the overlapped wires 42 and 48 through the metal tubes 54. These tubes 54 are flattened and welded together through the lead wires so as to form a satisfactory electrical connection. The lead wires 60 may have for an installation such as is described a diameter of 1/32" and they extend above the spacer block 52 through two passageways formed in a ceramic core block 62 as shown in Fig. 5.

Above the ceramic core block 62 these lead wires 60 extend on opposite sides of a spacer insulating block 64 and are there connected with the lead wires 66 that extend through the electric cord 24. The insulation 68 is stripped off the ends of these wires 66. These lead wires themselves are formed of a plurality of fine wires. The connected ends of the lead wires 60 and 66 are wrapped by suitable adhesive insulating tape 70 such as glass cloth tape as shown in Figs. 3 and 4.

The ceramic block 62 from which the lead wires 60 extend is disposed immediately above the ceramic tube 38 as shown in Fig. 6. The ceramic tube 38 which receives the insulating core 40 and the spacer block 52 is completely filled outside of such core and block and about the electric winding with suitable electric cement indicated as 72 and as shown in Fig. 6.

In the operation of the device the lower end of the heating element which approximates that lower portion of the core 40 about which the fine lead wire 42 is closely wound in a single strand is the portion which attains the high temperature. It may attain a temperature of 800° or 900° F. and the lower third, or 25% of the outer steel tube 28, is brought to such a high temperature within the tank. This temperature is rapidly reduced throughout the upper portion of the element. Throughout the upper end of the core 40 the spirals are farther apart and the overlapping lead wire 48 as it overlaps the wire 42 results in a reduction in temperature and such is still further reduced as connection is made with the lead wires 60 which extend through the core 62 as hereinabove described. As a result the upper end of the heating element is at a relatively low temperature. The water within the tank is heated throughout the lower layers thereof and produces a heat circulation within the tank which eventually brings the water therein to a temperature approximately that of the room, and because of the construction of the element as described and the amount of water normally retained within the tank, such temperature is not increased appreciably above room temperature. As a result the water within the tank is maintained at such a temperature that condensation does not form upon the outer surface of the tank.

What I claim is:

1. An electric heating element comprising, in combination, a heat conducting metal tube hermetically closed at one end, an electric conductor cord having two electric leads and having one end received within the opposite end of the tube with the two leads disposed therein, said tube being hermetically sealed about the cord, an electric insulating core element disposed within the closed end portion of the tube, an electric heating wire wound about the insulating core element in a succession of spirals and having its two ends terminating above the core and electrically connected with the two leads of the electric conductor cord, said electric heating wire being so spirally wound about the insulating core that successive spirals are insulated from each other and so as to provide one section of spiral windings about the core adjacent to the closed end of the metal tube throughout which section successive spirals are disposed in close proximity to each other, and a second section of spiral windings more remote from the closed end of the tube than the first section and throughout which second section successive spirals are disposed substantially further apart than the successive spirals are throughout the first section.

2. An electric heating element comprising, in combination, a heat conducting metal tube hermetically sealed at one end, an electric conductor cord having one end received within the opposite end of the tube and provided with two electric leads terminating within the tube, said tube being hermetically sealed about said cord, an electric insulating core element disposed within the closed end of the tube, an electric heating wire wound in a succession of spirals about the insulating core and having its two ends terminating above the core, said electric heating wire so spirally wound about the core that successive spirals are insulated from each other and so as to provide a succession of spiral windings adjacent the closed end of the metal tube throughout which section successive spirals are disposed in close proximity to each other and a second section of spiral windings more remote from the closed end of the tube than the first section and throughout which second section successive spirals are disposed substantially further apart than the successive spirals of the first section, two electric conductor wires disposed within the tube one of which conductor wires is connected at one end with one of the electric leads of the conductor cord and connected at the opposite end with one end of the electric heating wire, the other electric conductor wire being connected at one end with the other electric lead of the electric conductor cord and connected at the opposite end with the other end of the electric heating wire, that end of that electric conductor wire which is connected with the spiral winding end of the electric heating wire being connected therewith and extending therealong in overlapping relationship throughout the second section of spiral windings only.

3. An electric heating element as defined in claim 2 characterized in that a tube of insulating material is disposed within the closed end of the metal tube surrounding the insulating core and spaced therefrom, and further characterized in that electric insulating material is disposed and fixed within said insulating tube surrounding the electric heating wire spirally wound about the insulating core positioning said electric heating wire thereabout, and characterized further in that the core is provided with an axial passageway therethrough and one end of the electric heating wire extends through said passageway and terminates above the core, and characterized further in that the electric conductor wire which is connected with the end of the heating wire which extends through the axial passageway of the core extends into such passageway and overlaps the heating wire throughout the length of said second section of spirals only.

References Cited in the file of this patent
UNITED STATES PATENTS

| | | |
|---|---|---|
| 1,813,270 | Benedict | July 7, 1931 |
| 1,834,014 | Arnold | Dec. 1, 1931 |
| 2,432,169 | Morgan et al. | Dec. 9, 1947 |
| 2,508,512 | Grinde | May 23, 1950 |